AIRCRAFT LANDING GEAR

Filed Sept. 3, 1959 3 Sheets-Sheet 1

*INVENTOR.*
ERWIN H. HARTEL
*BY*
ATTORNEY

INVENTOR.
ERWIN H. HARTEL
BY *W. A. Fail*
ATTORNEY

Jan. 15, 1963 E. H. HARTEL 3,073,586

AIRCRAFT LANDING GEAR

Filed Sept. 3, 1959 3 Sheets-Sheet 3

INVENTOR.
ERWIN H. HARTEL
BY
ATTORNEY

United States Patent Office 3,073,586 Patented Jan. 15, 1963

3,073,586

AIRCRAFT LANDING GEAR

Erwin H. Hartel, Cleveland, Ohio, assignor to Cleveland Pneumatic Industries, Inc., Cleveland, Ohio, a corporation of Ohio Filed Sept. 3, 1959, Ser. No. 837,933
1 Claim. (Cl. 267—64)

This invention relates generally to aircraft landing gears and more particularly to a new an improved long stroke shock absorbing strut adapted to provide additional clearance for an aircraft during take-offs and landings.

In some aircraft designs, it is difficult to provide sufficient clearance to prevent the aft section of the fuselage from dragging during take-offs and landings while still maintaining a low static level for the aircraft. This problem is present particularly in cargo type aircraft wherein a long straight fuselage is provided for the storage of air cargo and wherein a low floor level is maintained to promote the ease of loading and unloading. In an aircraft landing gear according to this invention, the stroke of the shock strut is longer than would be necessary if only the landing impact were considered. The initial landing impact, therefore, produces only partial compression of the shock strut. After the partial compression, the nose of the aircraft drops to raise the aft end of the fuselage and the shock strut slowly lowers the aircraft to its normall static position.

It is an important object of this invention to provide a shock strut for aircraft wherein the normal impact of landing provides only partial compression of the landing gear and the remainder of the compression takes place against a very high damping or dash-pot resistance.

It is another important object of this invention to provide a landing gear wherein the hydraulic damping increases to a maximum before the landing gear is fully compresed.

It is still another object of this invention to provide a shock strut having a high damping rate through a portion of its stroke in combination with the relief means to prevent excessive pressures from occurring.

It is still another object of this invention to provide an air-oil landing gear shock strut including a metering pin which controls the damping of the shock strut wherein the metering pin is shaped to provide a high level of damping for a substantial portion of the shock strut stroke.

Further objects and advantages will appear from the following description and drawings, wherein.

Figure 1:
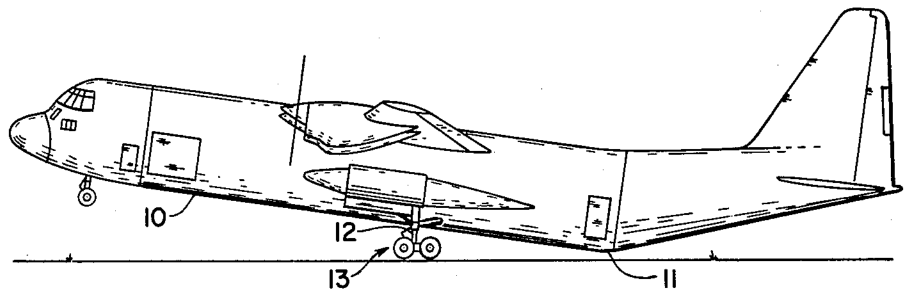
FIGURE 1 is a view of a cargo aircraft of the type to which a landing gear according to this invention is particularly suited showing the aircraft at the point of the point of touchdown with the landing gear fully extended.
Figure 2:
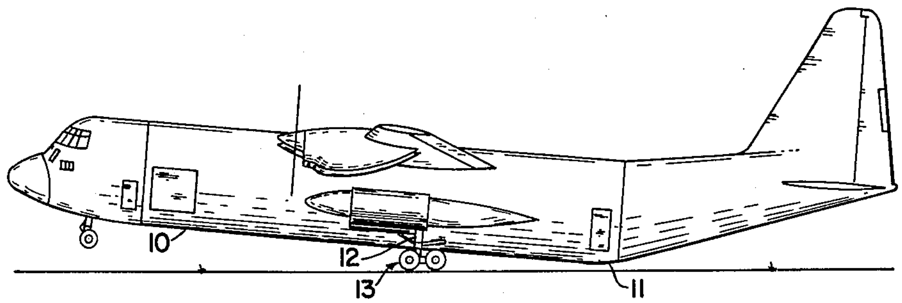
FIGURE 2 is a view similar to FIGURE 1 showing the position of the aircraft after the initial landing impact is absorbed by the landing gear.
Figure 3:
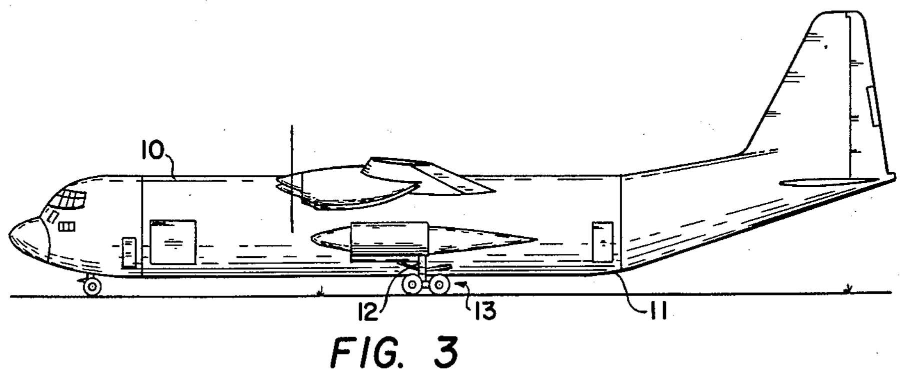
FIGURE 3 is a view similar to FIGURES 1 and 2 showing the aircraft in the static position at which time the weight of the aircraft is carried by the landing gears and equilibrium is reached.

In FIGURES 1 through 3, a landing sequence is shown for a cargo aircraft of the type to which a landing gear according to this invention is particularly suited. It should be noted that the fuselage 10 is long and that a relatively small clearance is provided at the aft end 11 of the fuselage 10 due to the nose-up attitude of the aircraft at touchdown. In FIGURE 2, the aircraft is shown at the end of the impact absorbing stroke of the shock strut 12 of the main landing gear 13 wherein the shock strut is in an intermediate position only partially compressed. Because of the long stroke provided by the shock strut 12, sufficient clearance is maintained at the aft end 11 of the fuselage 10 during this phase of the landing. The damping rate between the intermediate position of compression, shown in FIGURE 2, and the static position of FIGURE 3 is high so sufficient time elapses for the nose of the aircraft to drop lifting the aft end 11 before the static position of FIGURE 3 is reached.

Figure 4:
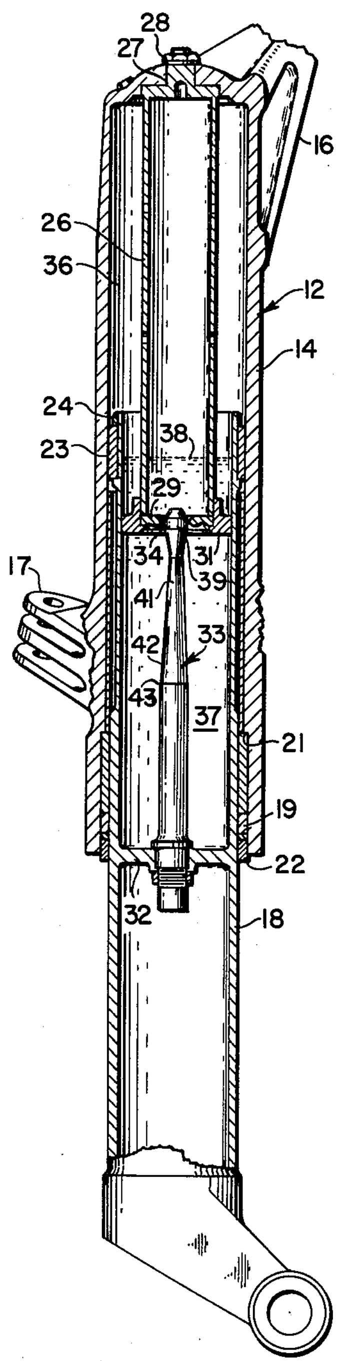
FIGURE 4 is an enlarged longitudinal section of a landing gear shock strut according to this invention in the extended position.

Referring to FIGURE 4, the shock strut 12 includes a cylinder 14 provided with a mounting arm 16 at its upper end for attaching the landing gear to the aircraft frame. The lower end of the cylinder 14 is formed with laterally projecting lugs 17 which provide an additional mounting point for supporting the cylinder 14 on the aircraft frame. A piston 18 projects into the open end of the cylinder 14 and is laterally supported by spaced bearings for axial movement between the fully extended position and the fully compressed position. A bearing and gland assembly 19, positioned against a shoulder 21 by a gland nut 22, provides one of the bearings and also the dynamic sealing engagement with the piston 18. A piston head bearing 23 is mounted at the head end of the piston 18 by a nut 24 to provide the second bearing.

A plunger tube 26 is mounted at its upper end in the cylinder 14 by means of an integrally formed stud 27 on which is threaded a nut 28. An orifice plate 29 is mounted on the lower end of the plunger tube 26 by a bearing ring 31 threaded onto the plunger tube. The piston 18 is formed with an internal bulkhead 32 on which is mounted a metering pin 33. The metering pin 33 extends through a centrally located orifice 34 formed in the orifice plate 29. The cylinder 14 and piston 18, in conjunction with the bulkhead 32, define a fluid tight cavity which contains compressed air and oil. This cavity is divided into an upper chamber 36 and a lower chamber 37 by the orifice plate 29 and bearing ring 31. When the landing gear is in the extended position of FIGURE 1, the oil level 38 is at a minimum distance above the orifice plate 29 as indicated in FIGURE 4. The remainder of the upper chamber 36 is filled with compressed air. As the piston 18 moves into the cylinder 14, oil is forced from the lower chamber 37 through the orifice 34 into the upper chamber 36. The resistance to flow through the orifice 34 around the metering pin 33 determines the damping rate which resists such compressive movement of the piston. In addition, the compressed air above the oil within the chamber 36 acts as a spring which urges the piston 18 downwardly relative to the cylinder 14.

The metering pin 33 is preferably formed with a knob 39 which is positioned in the orifice 34 when the shock strut is in the extended position of FIGURE 4. This produces a high rate of damping at the initial impact which loads the landing wheel tires at the initial point of the landing touchdown. Immediately below the knob 39, the metering pin 33 is formed with a portion of reduced section 41 which has an increasing diameter taper 42 terminating at a maximum diameter at 43. As the piston 18 moves into the cylinder 14 and the taper 42 moves through the orifice 34, the damping builds up until a maximum damping rate is reached when the point 43 of maximum diameter is in the orifice 34.

The diameter of the point 43 is proportioned to closely fit the orifice 34 so a very high resistance to flow through the orifice 34 is provided. The shock strut is sized so that the initial landing impact is absorbed by the shock strut when the piston 18 reaches the intermediate position wherein the point 43 is in the orifice 34. The metering pin 33 is formed with a uniform diameter from the point 43 to the lower end adjacent to the bulkhead 32. Therefore, a uniform high rate of damping or dash-pot action is provided between the intermediate position after the landing impact is absorbed and the static position of FIGURE 5. Because of this high rate of damping, the landing gear slowly moves to the static position of FIGURE 5 providing time for the nose of the aircraft to drop to the horizontal and lift the aft end 11.

Figure 6:
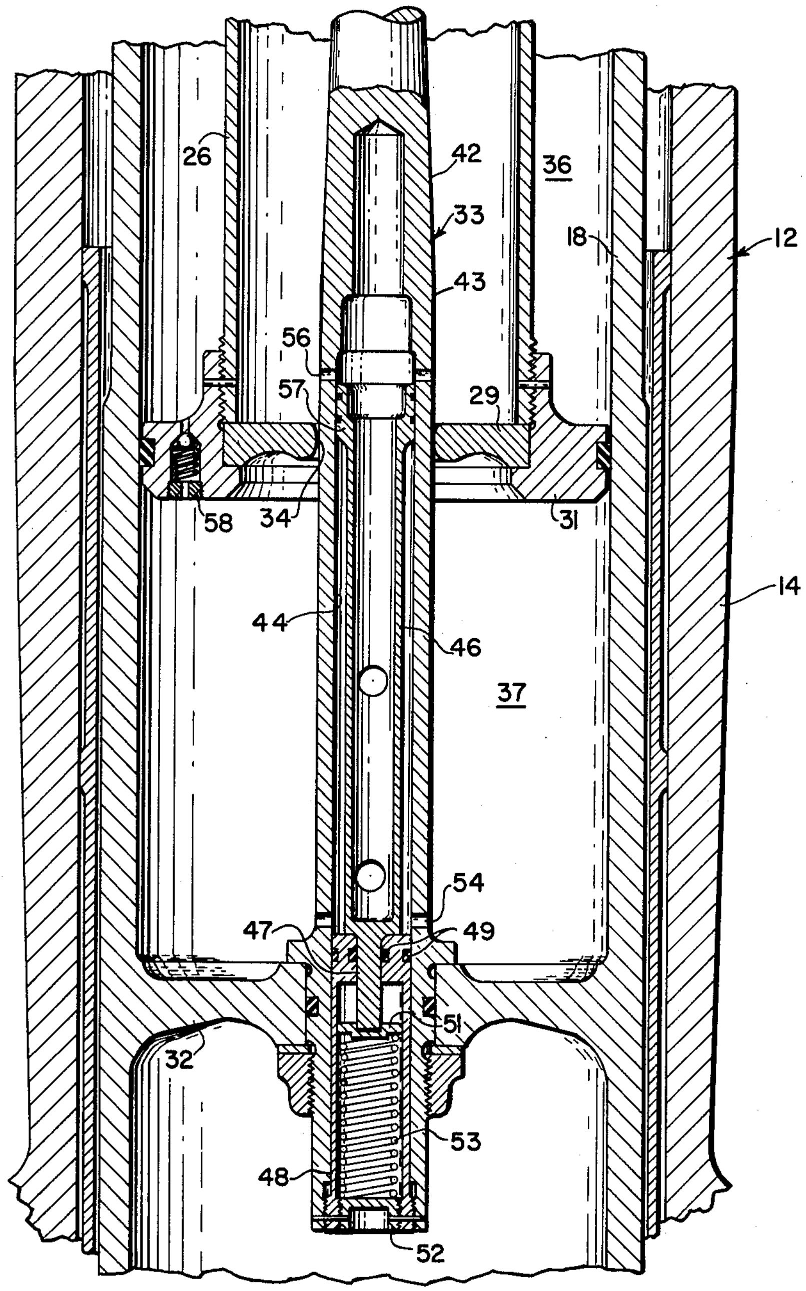
FIGURE 6 is an enlarged fragmentary view of the relief valve mechanism, which prevents excessive pressures, showing the valve in the operated position.

Referring to FIGURE 6, a relief valve mechanism is located within a bore 44 in the lower end of the metering pin 33. This mechanism includes a valve poppet 46 formed with an extension 47 which extends through a cup-shaped spring housing 48 threaded into the lower end of the bore 44. Seals 49 on the spring housing 48 provide sealing engagement with the extension 47. An upper spring retainer 51 engages the lower end of the extension 47 and a lower spring retainer 52 is threaded into the lower end of the spring housing 48. A spring 53 extends between the two spring retainers 51 and 52 and biases the valve poppet 46 upward to the normally closed position.

The metering pin 33 is formed with a plurality of lower ports 54 open between the lower chamber 37 and the bore 44, and a plurality of upper ports 56 open to the bore 44. When the landing gear is in position between the fully extended position of FIGURE 4 and the intermediate or partially compressed position, the upper ports 56 are closed to the lower chamber 37 and the relief valve cannot function. However, when the strut is compressed beyond the intermediate position, the upper ports 56 communicate with the upper chamber 36. The valve poppet 46 is formed with an apertured skirt having a valving ring 57 at its upper end which normally closes the upper ports 56.

When the pressure in the lower chamber 37 and in turn within the bore 44 reaches a predetermined maximum, a reaction force is developed on the valve poppet which overcomes the action of the spring 53 and moves the valve poppet 46 down to uncover the upper ports 56 and permit flow from the lower chamber 37 to the upper chamber 36 which by-passes the orifice 34. The force reaction developed by the pressure within the bore 44 on the valve poppet 46 is equal to the product of the cross sectional area of the extension 47 times the pressure within the bore. The relief valve mechanism, therefore, can operate to by-pass the orifice 34 during the high damping portion of the shock strut stroke to prevent excessive pressures from being developed. The relief valve is normally in the closed position but opens to relieve pressure when the landing wheels hit an object or a hole in the runway. Since the high damping rate is not reached until the landing gear is compressed to the intermediate position, the relief valve does not have to function during the first part of the stroke.

Figure 5:
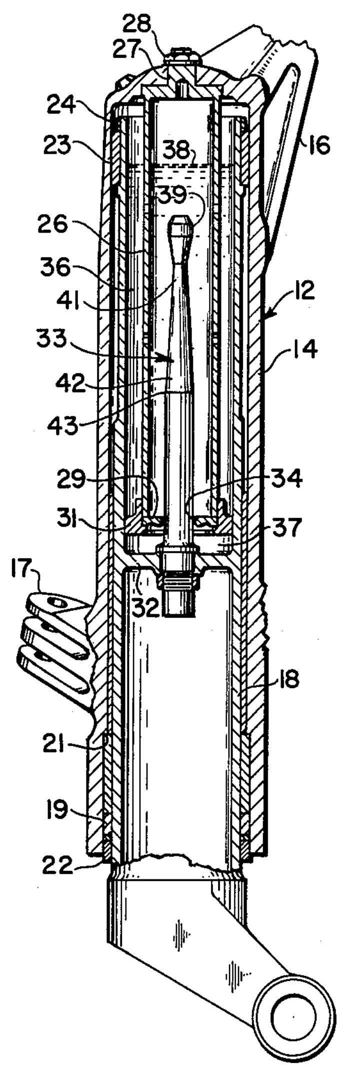
FIGURE 5 is a view similar to FIGURE 4 showing the position of the shock strut in the static position.

The high damping rate is provided during the first portion of the extension stroke from the static position of FIGURE 5 to the intermediate position so a back check valve 58 can be provided in the bearing ring to by-pass the orifice 34 on extension and permit rapid extension of the strut.

In operation, the shock strut is in the fully extended position immediately before touchdown. The impact energy of landing causes the piston 18 to move into the cylinder 14 from the fully extended position of FIGURE 4 to the intermediate position. At this point, the shock strut is only partially compressed but the impact energy of the landing is completely absorbed. During the further compression of the landing gear to the static position, the metering pin provides a high restriction to flow through the orifice 34 and a high damping rate or dashpot action permits the piston 18 to slowly move into the cylinder 14 until the static position is reached. This dashpot action provides sufficient time to elapse for the nose of the aircraft to be lowered to the horizintal position and raise the aft end of the fuselage. If an obstacle is encountered during this high damping portion of the stroke, the relief valve prevents excessive pressure from being developed by by-passing the orifice 34.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

I claim:

An aircraft landing gear for absorbing the forces of impact upon landing the aircraft comprising a pair of telescoping members movable relative to each other from an extended position to a contracted position, an element formed with an orifice on one of said telescoping members defining a first chamber and a second chamber and the volume of the first chamber being reduced by movement of said telescoping members relative to each other from extended to contracted position, fluid filling said first chamber and a portion of said second chamber, compressed gas filling the remainder of said second chamber, said orifice providing communication between said first chamber and said second chamber for flow to fluid from the first chamber to the second chamber and movement of said telescoping members relative to each other from extended position to contracted position forcing fluid through the orifice from the first chamber into the second chamber, a metering pin having one end secured to the other of the telescoping members and cooperating with said orifice to restrict the orifice and to govern the rate of flow of fluid from the first chamber to the second chamber for controlling the rate of damping of the movement of said telescoping members relative to each other from extended position to contracted position, said metering pin comprising a first damping portion cooperating with the orifice to produce a high damping rate at the instant of initial impact of landing the aircraft when said telescoping members are in extended position and another damping portion cooperating with the orifice to produce a damping rate less than said high damping rate and progressively increasing to said high damping rate at an intermediate position between said extended and contracted position as the telescoping members move relative to each other from extended position to said intermediate position and a last damping portion cooperating with the orifice to produce a uniform high rate of damping as said telescoping members move relatively to each other from said intermediate position to said contracted position, the metering pin being provided with a longitudinal bore terminating at a location spaced from the other end thereof and at least one port adjacent to the bottom of the first chamber in communication with the first chamber and the longitudinal bore and at least one port intermediate the ends thereof in communication with the longitudinal bore and normally closed relief valve means operable by pressure of fluid in said first chamber above a predetermined maximum pressure providing fluid communication between said chambers, the relief valve means comprising resilient means carried by the metering pin and a hollow poppet valve member reciprocably mounted in the longitudinal bore in the metering pin and provided with at least one opening therein in communication with its hollow interior and in communication with the longitudinal bore in the metering pin and upon a predetermined pressure being reached in the first chamber, the poppet valve member moving against the force of the resilient means to let fluid flow from the first chamber to the second chamber.

(References on following page)

References Cited in the file of this patent

UNITED STATES PATENTS

| | | |
|---|---|---|
| 1,219,035 | Pettengill | Mar. 13, 1917 |
| 1,780,531 | Messier | Nov. 4, 1930 |
| 2,492,765 | Porath | Dec. 27, 1949 |
| 2,735,674 | Smith et al. | Feb. 21, 1956 |

FOREIGN PATENTS

| | | |
|---|---|---|
| 992,347 | France | July 11, 1951 |

OTHER REFERENCES

NACA, TN-3803, October 1956.